United States Patent [19]
Gerlach

[11] 4,032,332
[45] June 28, 1977

[54] PROCESS FOR INCREASING THE RATE OF COPPER METAL PRODUCTION IN A QUINOLIC EXTRACTION SYSTEM

[75] Inventor: John N. Gerlach, Burlington, Mass.

[73] Assignee: Kennecott Copper Corporation, New York, N.Y.

[22] Filed: Sept. 3, 1976

[21] Appl. No.: 720,415

[52] U.S. Cl. .................................. 75/108; 75/109; 75/.5 A; 75/117; 423/23

[51] Int. Cl.$^2$ ........................................ C22B 15/12

[58] Field of Search ................. 75/117, 101 R, 108, 75/109, .5 A; 423/23, 573 R, 588

[56] References Cited

UNITED STATES PATENTS

| | | | |
|---|---|---|---|
| 2,390,540 | 12/1945 | Keller | 75/108 |
| 2,813,020 | 11/1957 | VanHare | 75/109 |
| 3,785,944 | 1/1974 | Atwood et al. | 204/107 |
| 3,798,026 | 3/1974 | Milner et al. | 75/104 |
| 3,820,979 | 6/1974 | Manassen | 75/108 |
| 3,838,178 | 9/1974 | Vaughan | 423/588 X |
| 3,923,966 | 12/1975 | Vaughan | 423/573 |
| 3,940,261 | 2/1976 | Dannelly et al. | 75/.5 A |
| 3,962,288 | 6/1976 | Vaughan | 423/588 X |

*Primary Examiner*—G. Ozaki
*Attorney, Agent, or Firm*—John L. Sniado; Anthony M. Lorusso

[57] ABSTRACT

Improvements are disclosed for a process of the type in which copper metal is produced by contacting an aqueous solution containing copper ions with a quinolic compound to result in the precipitation of copper metal. In this type of process, a quinonic compound is also produced during copper precipitation and it may be reduced to the quinolic compound for reuse in precipitating more copper metal.

A two step reduction of copper is disclosed. In a first step, cupric copper is reduced to cuprous copper and in the second step, cuprous copper is reduced to copper metal.

The inclusion of selected concentrations of chloride aromide and thiocyanate ions in the copper solution is disclosed to increase the rate at which copper is precipitated.

The in-situ conversion of the quinolic compound contained in the raffinate to the quinonic compound is also disclosed to reduce extractant losses in the aqueous phase.

A solvent system in which the percentage of nonpolar solvent in a mixed organic solvent system is increased is also disclosed to increase the rate of reduction of copper metal.

26 Claims, 3 Drawing Figures

PROCESS FOR INCREASING THE RATE OF COPPER METAL PRODUCTION IN A QUINOLIC EXTRACTION SYSTEM

BACKGROUND OF THE INVENTION

This invention relates to improvements in the extraction of copper from solutions by reduction with anthraquinols dissolved in a water immiscible solvent.

U.S. Pat. No. 3,820,979 to J. Manassen, entitled *Process for the Production of Metals*, the disclosure of which is herein incorporated by reference, discloses a process for the production of copper, silver, and mercury from aqueous solutions containing these values. In the process of that patent, a quinolic compound (anthraquinol), which is dissolved in a water immiscible organic solvent, contacts an aqueous solution containing metal values of interest, such as copper ions, in either the cupric or cuprous state, to reduce the metal ions and to produce a metallic powder. After this reduction, the metallic precipitate is separated; the organic and aqueous phases are separated; and, if desired, the quinolic compound, which is oxidized during the process to a quinonic compound (anthraquinone), is regenerated by reduction and used for treating further batches of aqueous metallic salt solutions.

Especially advantageous reducing agents are anthraquinols, which, during the reduction of the metals are oxidized to anthraquinones. Particularly suitable anthraquinols are 2-methyl-anthraquinol, 2-ethyl-anthraquinol, 2-propylanthraquinol, 2-isopropyl anthraquinol, 2-t-butyl anthraquinol, and 2-amyl-anthraquinol. Tetrahydroanthraquinols and 2-substituted tetrahydroanthraquinols can also be used. The oxidized form of these compounds (anthraquinones) can be easily produced by condensation of a suitably substituted diene and naphthaquinone, according to the procedure of Alan et al., Organic Synthesis 22,37 (1947). The quinol can thereafter be made by hydrogenation.

An important consideration in the choice of the particular anthraquinol to be employed is its solubility in the organic solvent system used. Preferred solvent systems suitable for the quinol and for the quinone produced during the process are combinations of nonpolar and polar solvents. It is known that in order to minimize losses due to the evaporation of the organic solvent, nonpolar solvents such as alkyl toluenes, alkyl naphthalenes, or disphenyls are advantageously resorted to. Polar solvents, such as octanol and ethyl hexanol or diisobutylketone are preferred. Esters such as dialkyl phthalates, diaryl phthalates, alkyl benzoates, benzyl acetates, ethyl heptanoates and cyclohexanol acetates or propionates can be used as such or in combination with another organic solvent.

The Manassen patent also teaches that it is possible to reduce and precipitate a large part of the reducible metals contained in the solution by employing an excess of the reducing agent. In addition, it is taught to be advantageous to effect the process in two or more stages, using a suitable quantity of fresh organic solution in each stage.

The Manassen patent, however, does not deal with many of the problems that would be encountered in practicing the process on a commercial scale. Specifically, the patent does not address itself to methods of optimizing the rate of precipitation of the metals of interest nor to conserving the organic extractant employed so as to provide an efficient, continuous process.

SUMMARY OF THE INVENTION

In accordance with the invention, it has been discovered that the presence of chloride, bromide or thiocyanate ($SCN^-$) ions in copper bearing pregnant liquor has a significant effect on the rate of copper reduction effected by utilizing a process of the type outlined above. Specifically, it has been observed that the copper contained in basic solutions may be reduced at a significantly greater rate when a concentration of such ions is incorporated into the copper bearing liquor and thereafter treated as disclosed above. In this regard, even trace amounts of these ions have a beneficial, rate-increasing effect, and high concentrations may be used if desired. To take advantage of this behavior, it has been discovered that these ions should be added in the form of a soluble salt in a concentration determined by economic factors such as the cost of the salt and the effect, if any, of various concentrations of the ions on the components of the recovery system.

In the case of acidic copper solutions, high concentrations of chloride have been observed to slow or even stop copper precipitation. On the other hand, low concentrations of chloride, i.e., on the order of 0.05M or less, have a beneficial effect similar to that observed in basic solutions.

It has been also discovered that when the percentage of aromatic solvent in a mixed organic solvent system carrying the organic extractant is increased over that taught in the prior art, the rate of reduction of copper to metal is increased.

Also, it has been found that, in general, as the pH of the copper bearing solution is increased, the reaction rate also increases.

These discoveries permit a process to be designed which significantly increases the rate of copper production and has important economic advantages.

Accordingly an object of the invention is to provide a commercially aceptable process for extracting copper from pregnant liquors using quinolic compounds.

Another object of the invention is to provide a process for recovering copper metal from pregnant liquors using quinolic compounds in which the rate of copper reduction is increased by the presence of effective amounts of chloride, bromide or thiocyanate ions in the pregnant liquor.

Another object of the invention is to control the pH of the pregnant liquor containing copper values to increase the efficiency of a reaction of the copper values with quinolic compounds to produce recoverable copper metal.

Yet another object of the invention is to optimize the ratio of nonpolar solvent to polar solvent in systems wherein such mixed solvents are used to carry a quinolic compound used in the reduction of copper ions to copper metals.

DESCRIPTION OF THE PREFERRED EMBODIMENT

Figure 1:
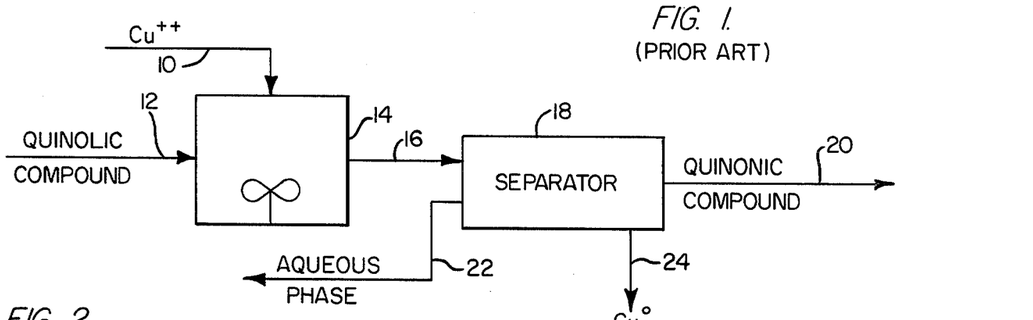
FIG. 1 is a diagram illustrating a prior art process for producing copper metal by reducing copper ions with a quinolic compound.

In order to facilitate understanding of the present invention, a description of the prior art follows. In the prior art processes, as illustrated in FIG. 1, a pregnant solution 10 which may be an aqueous ammoniacal leach liquor containing cupric ions is contacted with a quinolic compound 12 such as an anthraquinol. The aqueous phase 10 and the organic phase 12 are mixed in a mixer 14 to effect reduction of the cupric copper to copper metal. The quinolic compound (anthraquinol) is oxidized to a quinonic compound (anthraquinone). The three phases represented by stream 16 are sent to a filter and settler 18 where they are separated into the three phases, that is, organic phase 20 containing the quinonic compound, the aqueous phase 22, and the copper metal 24.

The economics of a commercially successful system of the type disclosed requires a rapid and complete removal of copper from solution and minimal losses of organic extractant in the raffinate. In the prior art process illustrated in FIG. 1, these two goals conflict because the use of an excess of the quinolic reducing agent 12, (the most expensive component of the organic phase) to achieve complete and rapid removal of copper or other metals results in significant amounts of the quinolic reducing agent remaining dissolved in the raffinate 22. In this regard, it has been discovered that when ammoniacal solutions are treated to recover copper values, the reduction of cupric ions to cuprous ions by quinolic reducing agents is much faster than the reduction of cuprous ions to copper metal using these reagents. The cupric ions to cuprous ion reaction has been observed to take place quantitatively in less than about 5 seconds if the two phases are thoroughly mixed. On the other hand, under optimum conditions, the reaction of cuprous ions to copper metal takes place in about 2 to about 30 minutes.

When the organic and aqueous phases are thoroughly mixed in a single vessel 14, the presence of excess quinolic reducing agent 12 accelerates the rate of copper reduction, but from a practical commercial point of view, any more than a small excess of the reducing agent circulating in the process stream 22 creates problems of separation and reagent loss which are unacceptable. Furthermore, it is impractical to operate the system using a countercurrent flow of organic and aqueous phases because of the high cost associated with achieving a separation for a three phase system after each mixer stage.

Figure 2:
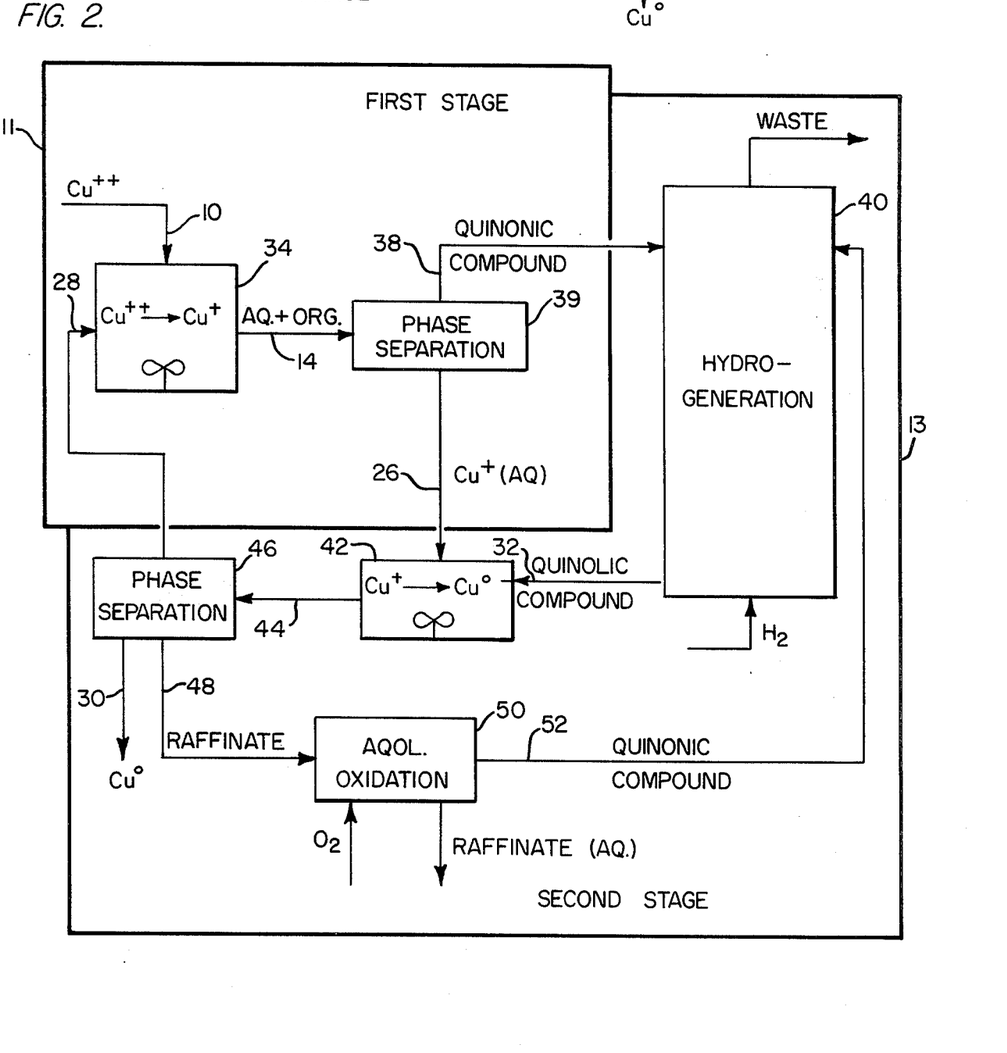
FIG. 2 is a diagram illustrating several improvements of the process illustrated in FIG. 1.

In the preferred embodiment of the present invention, a two stage reduction system, as is shown in FIG. 2, is employed which combines a rapid reduction of ammoniacal cupric solution, represented by stream 10, to form a stable, ammoniacal cuprous solution, represented by stream 26 using minimal quantities of anthraquinol introduced through stream 28 in a first stage. The reduction of the cuprous ions to copper metal is accelerated by excess reducing agent represented by stream 32 in a second stage. Accordingly, by using this two stage reduction scheme, an improved system for the recovery of copper can be designed. In the two stage system, as is shown in FIG. 2, only one three-phase separation need be effected. Each stage 11 and 13 can include one or several concurrent mixers and can end in a phase separation step.

In the first stage 11, an ammoniacal cupric feed stream 10 is mixed with an appropriate amount of a quinolic reducing agent 28, which has been already partially used in second stage 13. Utilizing the appropriate amount of quinolic agent in mixer 34 results in formation of a stable (in the absence of oxygen) cuprous complex and in the oxidation of the quinol to a quinone.

Since no solid copper is formed in mixer 34, a conventional aqueous-organic phase separation may be carried out in separator 39. Because of the aqueous-organic density difference and the need for relatively minimal mixing, this separation can be effected rapidly and inexpensively by conventional techniques. The spent organic phase exiting from the first stage 11 through stream 38 can then be cycled to a hydrogenator 40 for the regeneration and recycle. In the hydrogenator, the quinones are converted to quinols by reaction with hydrogen in accordance with known procedures. The aqueous phase from the first stage is sent through stream 26 to the second stage 13 where it is contacted in mixer 42 with fresh quinol solution received via stream 32 from the hydrogenator 40. This stage, the slow step in a copper reduction process, is accelerated by the use of a quinol solution which contains a stoichiometric excess, preferably twice as much, quinol as is necessary to reduce the cuprous ion in solution to copper. By utilizing the two stages, the overall reaction rate of $Cu^{++} \rightarrow Cu^0$ is greatly accelerated.

In the second stage 13, the three phase slurry is delivered through stream 44 to a phase separation stage 46 to be separated into copper metal 30, aqueous phase 48, and organic phase 28. After being separated from the aqueous phase in stage 46, the organic phase 28 containing the partially spent quinol can then be directed to the first stage 11, where the balance of the quinol is consumed and where an excess is not required. The copper metal leaves the system for further processing through stream 30 and the raffinate may be treated as disclosed below.

Simplified chemical reactions for the process described above appear below:

IN CUPRIC REDUCTION STAGE 34

IN CUPROUS REDUCTION STAGE 42

IN THE HYDROGENATOR 40

Semiquinones, such as compounds have the structural formula:

are believed to also take part in the reactions.

The two stage reduction of cupric ions is further illustrated by the following non-limiting example.

EXAMPLE I

An aqueous, cupric ion containing solution was prepared by adding 19.65 g of $CuSO_4.5H_2O$, 17.0 g of $NH_3$, and 36.0 g of $(NH_4)_2SO_4$ in enough water to make 1 liter of solution. 21.3 of 2-ethyl-anthraquinol were dissolved in enough mixed solvent comprising 70% xylene (nonpolar) and 30% 2-ethyl-hexanol (polar) to produce 1 liter of solution. At 50° and under an inert atmosphere, 100 ml of the aqueous solution were placed in a 500 ml reactor vessel fitted with baffles and a 5 cm marine propeller rotatable at 2000 rpm. An amount of the mixed solvent containing the quinol prepared as disclosed above containing the stoichiometric amount of 2-ethylanthraquinol necessary to reduce all $Cu^{++}$ to $Cu^+$ was then added to the vessel and the propeller was energized. When the $Cu^{++}$ was reduced to $Cu^+$ the mixing was stopped and the spent organic phase removed. A two fold excess of quinol was added to the reaction vessel and the propeller energized. The results of two runs utilizing this procedure are set forth below:

| TIME (MIN.) | PPM $Cu^{++}$ in Aqueous Phase | |
|---|---|---|
| | No. 1 | No. 2 |
| 0 | 5000 | 5000 |
| 1 | — | 292 |
| 2 | 23.7 | 4.83 |

As can be seen from these data, essentially quantitative reduction of $Cu^+$ to $Cu^0$ was achieved in a very short time. The partially spent organic phase can now be used to reduce $Cu^{++}$ to $Cu^+$.

At this point it should be noted that the foregoing two stage reduction scheme is the preferred embodiment of the invention. However, the invention toward which claims in the present application are directed involves the use of ions such as chloride, bromide, thiocyanate, and mixtures thereof to increase the rate of reduction of soluble copper to copper metal.

In connection with the foregoing, effective amounts of these ions can be utilized to great advantage in the prior art processes such as the one illustrated by FIG. 1 of the drawing. Thus, the invention is not intended to be limited to the two stage reduction system discussed above.

According to another aspect of the invention, it has been discovered that the pH of the aqueous phase, i.e., the pH of phase 10 containing the copper ions, influences the rate of copper reduction. In general, the higher the pH, the faster the reaction rate. A study of reaction rates versus pH in the alkaline range indicates that, in general, the rate increases as pH increases. Similar behavior has been observed in the acid range. However, extrapolation of pH-reaction rate curves over the entire pH range is not feasible. This latter behavior is believed to be a direct result of the different copper species present in ammoniacal and acid solutions.

During the reduction of copper, hydrogen ions are liberated when the quinonic compounds are formed and hence, the pH is lowered as the reduction proceeds. In view of this phenomenon, in accordance with the teaching of this invention, the ideal process should employ copper solutions having a pH on the order of 9.5 or higher, e.g., fairly concentrated ammoniacal solutions, thereby decreasing the time required to achieve a suitable amount of copper reduction. The preferred pH value range is from about 9.5 to about 11.0. Obviously, this discovery may be utilized to advantage in conventional anthraquinol copper extraction processes such as those set forth in U.S. Pat. No. 3,820,979.

The preferred mode for practicing the invention utilizes chloride ions to accelerate the reduction of copper ions. Depending on the concentration and the pH of the copper solution, the presence of chloride ion in the copper containing aqueous solution can accelerate, decelerate, or even prevent the reduction of copper to metal by quinols. In the acid range, low chloride concentrations have been found to accelerate the reduction process; whereas, high chloride concentrations slow or even stop the process. In the basic range, i.e., pH above about 7, any concentration of chloride in the aqueous copper bearing liquor increases the reaction rate. Low concentrations of bromide ion ($Br^-$) and thiocyanate ion ($SCN^-$) also increase the reaction rate and may be used in this modification of the process. Accordingly, it is apparent that a significant impact on the economics of the process can be made by the inclusion of appropriate amounts of chloride ions, bromide ions, thiocyanate ions and mixtures thereof. The following examples illustrate the principle.

EXAMPLE II

Four ammoniacal copper solutions were subjected to batch treatment with 2-ethyl-anthraquinol dissolved in a mixed solvent comprising 62.5% xylene and 37.5% 2-ethylhexanol at 40° C. At regular intervals, aliquots of the solutions were extracted and analyzed for the presence of soluble copper ($Cu^{++}$ and $Cu^+$). The concentration of $Cu^+$ in the solutions and the concentration of $Cl^-$ are indicated below.

TABLE I

| ALKALINE SOLUTIONS WITH AND WITHOUT CHLORIDE | | | | |
|---|---|---|---|---|
| Tests | 1 | 2 | 3 | 4 |
| M[$Cl^-$] | 0 | 0 | 0.015 | 1 |
| M[$Cu^+$] | 0.079 | 0.077 | 0.077 | 0.079 |
| Time in min. | ppM $Cu^{++}$ remaining in solution | | | |
| 5 | — | 3750 | 340 | — |
| 10 | 1472 | 1880 | 20 | 2 |
| 20 | 417 | 185 | 1 | — |
| 30 | 50 | 4 | — | — |

As can be seen from Table I by comparison of the results of the tests on solutions 3 and 4 with those of solutions 1 and 2, the inclusion of $Cl^-$ significantly increases the rate at which copper is extracted from the solution. Further, the acceleration is substantial at chloride concentrations as low as 0.015M and does not decrease as the molarity is raised.

EXAMPLE III

Four acidic copper solutions were subjected to treatment with 2-ethyl-anthraquinol dissolved in a mixed solvent comprising 62.5% xylene and 37.5% 2-ethylhexanol. The data in Table II set forth below is consistent with Example 1, and clearly shows that the inclusion of small concentrations of chloride ion can significantly increase the reaction rate. Chloride ion concentrations of 0.8M result in a substantial reduction in the rate of the reaction $Cu^{++} \rightarrow Cu^0$; higher concentrations completely stop the reaction.

TABLE II

ACIDIC SOLUTIONS WITH AND WITHOUT CHLORIDE

| | 1 | 2 | 3 | 4 | 5 |
|---|---|---|---|---|---|
| M[Cl$^-$] | 0 | 0.0008 | 0.08 | 0.8 | 0.8 |
| M[Cu$^{++}$] | 0.08 | 0.08 | 0.08 | 0.08 | 0.08 |
| Time (min.) | | ppM Cu remaining in solution | | | |
| 10 | 2300 | 370 | 560 | 5000 | 5000 |
| 20 | 900 | 1.2 | — | 4600 | 4800 |
| 30 | 250 | 1.0 | 5.2 | 4250 | 4800 |

A probable explanation for this phenomenon is that chloride ions can form a weak CuCl$^+$ complex which is easily reduced to CuCl and then further reduced to metal. At high chloride ion concentrations, the reaction only goes to the cuprous state, $Cu^{++} \rightarrow Cu^+$. The cuprous ion which is normally unstable in acidic aqueous solutions is apparently stabilized as CuCl$_2^-$, CuCl$_3^{-2}$, or CuCl$_4^{-3}$ and as a result, cannot be reduced to the metallic state by anthraquinols.

Three examples were also performed to test the affect of Br$^-$ ion and SCN$^-$ ion on copper extraction rates. The results of these tests appear below. In each of these tests T=40° C and the organic solvent comprised 60% xylene and 40% 2-ethylhexanol.

EXAMPLE A

| M[Br$^-$] | 0.00079 |
|---|---|
| M[Cu$^{++}$] | 0.079 |
| Time (Min.) | ppM Cu$^+$ remaining in solution |
| 2 | 890 |
| 5 | 35 |

EXAMPLE B

| M[SCN$^-$] | 0.00106 |
|---|---|
| M[Cu$^{++}$] | 0.079 |
| Time (Min.) | ppM Cu$^+$ remaining in solution |
| 2 | 8 |

EXAMPLE C

| M[SCN$^-$] | 0.00086 |
|---|---|
| M[Cu$^{++}$] | 0.079 |
| Time (Min.) | ppM Cu$^+$ remaining in solution |
| 1 | 740 |
| 2 | 11 |

Chloride concentrations between 0.1 and 0.001 M have been observed to accelerate copper reduction in both acidic and basic solutions relative to identical solutions containing no chloride. In ammoniacal solutions, both low and high chloride concentrations increase the reaction rate. Accordingly, economic considerations will dictate the amount of chloride ion to be added to the copper solution. At present, in ammoniacal solutions, a concentration of between about 0.001M and 0.5M is preferred. Of course, chloride ion may be included in copper solutions to be treated by extraction processes other than the two-stage process disclosed herein. Similar effects would be observed by the use of between 0.1 and 0.001M concentrations of bromide ions or thiocynate ions. Specifically this discovery of selected ion activity may be used to advantage in the conventional copper recovery processes set forth in U.S. Pat. No. 3,820,979.

As stated above, the preferred prior art solvents for the quinolic compounds used as reducing agents in the process consist of mutually miscible combinations of nonpolar solvents such as variously substituted benzenes and naphthalenes, and polar solvents such as alcohols, ketones, and esters. The quinones are dissolved primarily in the nonpolar solvent, and the quinols are dissolved in the polar solvent.

According to another aspect of the invention, it has been discovered that the percent concentration of the nonpolar and polar solvents can be varied to increase the reaction rate. Specifically, when the amount of polar solvent is decreased and nonpolar solvent is substituted therefor, unexpectedly, the reduction of dissolved copper to metal is increased. The following examples illustrate this principle.

EXAMPLE IV

Two ammoniacal copper solutions were prepared, each of which contained 3,000 ppm aqueous copper. A first water immiscible solvent was prepared by adding 20 ml of the nonpolar solvent xylene and 80 ml of the polar solvent diisobutylketone to form 100 ml of a 20% xylene solution. A second mixed solvent was prepared by adding 50 ml xylene to 50 ml of diisobutylketone to produce a 50% xylene mixed solvent. 14.8 grams of 2-ethylanthraquinol were dissolved in each organic solution. The first solution was added to an aqueous copper solution and agitated. The second solution as added to an identical aqueous copper solution and agitated. The rate of copper precipitation, as indirectly measured by the ppm aqueous copper remaining in solution at various times during the reduction, is set forth in Table III below.

TABLE III

| | 20% xylene solution | 50% xylene solution |
|---|---|---|
| Time (Min.) | ppm Cu remaining in solution | |
| 0 | 3000 | 3000 |
| 5 | 2675 | 1710 |
| 10 | 2070 | 540 |
| 15 | 1432 | 74 |

As can be seen from these data, as the percentage of the nonpolar solvent was increased from 20% to 50%, the rate of copper precipitation was significantly increased.

EXAMPLE V

A. The procedure of Example IV was repeated except that 2-ethylhexanol was substituted for the diisobutylketone, the aqueous solution contained 5100 parts per million copper instead of 3000, and the two mixed solvents prepared consisted of, respectively, 50% xylene and 60% xylene. The results of the rate of copper precipitation in these two systems are indicated in Table IV below.

TABLE IV

| | 50% xylene solution | 60% xylene solution |
|---|---|---|
| Time (Min.) | ppm Cu remaining in solution | |
| 0 | 5100 | 5100 |
| 10 | 2850 | 1472 |

TABLE IV-continued

| Time (Min.) | 50% xylene solution | 60% xylene solution |
|---|---|---|
| | ppm Cu remaining in solution | |
| 20 | 1340 | 417 |
| 30 | 500 | 50 |

B. The procedure of Example 5A was repeated with the aqueous solution containing 5000 parts per million copper and the two solvents containing 60% and 70% xylene respectively. Results are indicated in Table V below.

TABLE V

| Time (Min.) | 60% xylene solution | 70% xylene solution |
|---|---|---|
| | ppm Cu remaining in solution | |
| 0 | 5000 | 5000 |
| 2 | 2000 | 1062 |
| 5 | 578 | 5 |
| 10 | 4 | 1 |

T = 50° C    pH = 9.8
Ammoniacal copper solution
slight excess of 2-ethylanthraquinol As can be seen from the above data, even a relatively modest increase of 10% xylene can significantly increase the rate of copper precipitation. In accordance with the invention, it is contemplated that the maximum amount of nonpolar solvent should be used in the mixed solvent, which amount will be dependent upon the solubility of the particular anthraquinol/anthraquinone used, the concentration used, and the temperature selected for the extraction. Non limiting examples of other useful nonpolar organic solvents include toluene, naphthalenes, and various other lower alkyl substituted benzenes. Non limiting examples of organic polar solvents include alcohols, ketones, and esters. Of course, as will be appreciated by those skilled in the art, this discovery will find utility in conventional anthraquinol copper recovery processes as well as in the two step process as disclosed herein.

In U.S. application Ser. No. 720,416 filed on even date herewith, by John N. Gerlach, entitled *Process for Conserving Quinolic Compounds in an Organic Extractant Copper Recovery System*, the teaching of which are incorporated herein by reference, it is disclosed that the various quinols used in this process are much more soluble in water than their corresponding quinones. This water solubility variation is especially pronounced for ammoniacal solutions where a water soluble ammonium salt exists in equilibrium with the quinols, i.e., $H_2AQ + 2NH_3 \rightleftarrows AQ^= + 2 NH_4^+$, where AQ is the quinone moiety. In concentrated ammonia solutions, the quinols useful in this process are in fact completely miscible in water. Since, as indicated above, a practical commercial system requires both a rapid and complete removal of copper from solution and a low loss of the organic phase in the raffinate, it would be highly desirable to minimize losses of the organic phase. In this regard, the preferred mode of producing the two stage reaction process disclosed above includes oxidizing the quinol dissolved in the raffinate by bubbling an oxidizing gas therethrough. By utilizing this step, quinol losses through the raffinate exiting from separator 46 through stream 48 can be substantially reduced. Air can be used with success in this process. Since quinones are much more insoluble in water under all conditions than are the corresponding quinols, the quinones form a precipitate which can be removed by filtration or extracted by a suitable organic solvent. The quninone produced in oxidation reactor 50 (FIG. 2) is passed through stream 52 to eventually be reduced to quinol in hydrogenator 40. This treatment results in aqueous anthraquinone concentrations on the order of 1 to 10 ppm versus 660 ppm before oxidation. The following example illustrates this principle.

EXAMPLE VI

A 10% ammonia solution of copper sulfate was contacted with an excess of 2-t-butyl anthraquinol in an organic solvent consisting of 40% 2-ethylhexanol and 60% xylene. After mixing 5 minutes, copper metal was removed by filtration and the organic and aqueous phases were separated. Before bubbling air through the aqueous raffinate, 600 ppm of 2-t-butyl anthraquinol was present. After bubbling air through the raffinate to form insoluble 2-t-butyl anthraquinone, only 3 ppm of 2-t-butyl anthraquinol remained.

It should be noted that the oxidation of the quinol which would otherwise be lost in the aqueous raffinate may take place either before or after the organic and aqueous phases are separated in stage 46, but in any case, of course, should not be effected prior to separation of copper from the liquid phases. While bubbling oxygen through the raffinate is a preferred method of oxidizing the quinol, those skilled in the art will appreciate that other oxidizing gases, such as chlorine gas, may be substituted for oxygen, and indeed, that solutions of oxidizing agents such as ferric or hypochlorite ions may be added to recover the selected organic extractant in the oxidized form. Of course, this quinol recovery may be used in a conventional extraction copper recovery process of the type set forth in the aforementioned U.S. Pat. No. 3,820,979. In fact, the excesses, typically 10 to 15%, of quinolic extractant used in such processes renders the advantage achievable by this procedure particularly significant.

The foregoing principles and discoveries may be combined as desired to provide an efficient commercial process for reducing copper containing solutions to pure copper metal. FIG. 2 illustrates one embodiment of a system designed for utilizing such a process. Obviously, those skilled in the art will be able to make modifications without departing from the scope of the instant invention.

In FIG. 2, an ammoniacal solution 10 of cupric ions which may be obtained by a variety of processes is added to a reactor 34 together with a partially reduced portion of an arthraquinol 28 dissolved in an organic solvent. If desired, the ammoniacal cupric solution 10 can contain chloride, bromide or thiocyanate ions, e.g. 0.01M. The ammonia acts as a buffer to stabilize the pH of solution 10 which, optimally should be from about 9.5 to about 11. The organic solvent in which the partially spent anthraquinol 28 is dissolved may contain both nonpolar solvent and a polar solvent, and preferably, in order to increase the reaction rate, it will contain greater than about 50% of the nonpolar solvent in accordance with the principals set forth above. Preferably the mixed solvent will contain between 60-80 wt.% of the nonpolar solvent. In reaction vessel 34, within 5 seconds, the $Cu^{++}$ is reduced to $Cu^+$ which is stabilized in the ammoniacal solution by the formation of the cuprous amine complex: $Cu(NH_3)_4^+$. Since this chemical change takes place very rapidly, vessel 34 may be relatively small and thus will be characterized by a low cost. To assure rapid reaction, it is essential that the organic and aqueous phases be intimately mixed to form a fine dispersion.

After reaction in vessel 34, the aqueous and organic solutions exit through stream 14 to a settler 39 where the aqueous solution containing $Cu^+$ ions and small amounts of dissolved anthraquinol are separated. The organic phase containing the anthraquinone is delivered to a hydrogenator 40 containing a catalyst such as Raney nickel, platinum, palladium or the like for reducing anthraquinone, in situ, to anthraquinol. The output 32 of the hydrogenator 40 and the ammoniacal cuprous solution passing in stream 26 from the settler 39 are mixed together in a reaction vessel 42 (second stage) and are agitated for a sufficient amount of time to reduce substantially all the cuprous ion to copper metal. The metal precipitates as a powder but will contain silver and mercury if either of these are present in the original ammoniacal cuprous solution. The copper powder may therafter be separated as 30 from the two-phase aqueous system by filtration, and melted or otherwise refined as desired.

The high concentration of the anthraquinol in reactor 42 optimizes the rate of reduction of cuprous ion to copper metal, which as indicated above, is the slow step in the two stage reduction. It should be noted that only a slight stoichiometric excess of the total anthraquinol needed for both stages need be circulated in the system as quinolic compound from hydrogenator 40 because the quinolic compound first contacts a copper solution in reactor 42 which has already been reduced to $Cu^+$. Thus, in reactor 42, more than twice the total stoichiometric amount of anthraquinol required for complete reduction of $Cu^{++}$ to $Cu^\circ$ is present.

The three phase dispersion is then delivered through stream 44 to a second settler 46 from which the copper may be recovered and the organic phase 28, which contains solvent, both unused anthraquinol and anthraquinone produced in mixer 42, may be delivered to reaction vessel 34. As indicated previously, the $Cu^{++} \rightarrow Cu^+$ reduction has a rate which is relatively independent of anthraquinol concentration, and thus, the partially spent solution of anthraquinol can effect this reduction without an additional regeneration.

Since the aqueous raffinate separated in settler 46 will contain a significant concentration of anthraquinol, prior to its disposal, it may be delivered through stream 48 to be contacted with an oxidizing agent such as air or $O_2$ in a recovery unit 50. The oxygen oxidizes the dissolved anthraquinol to water insoluble anthraquinone. The precpitated anthraquinone may then be removed and recycled to the hydrogenator 40 for further use.

Figure 3:
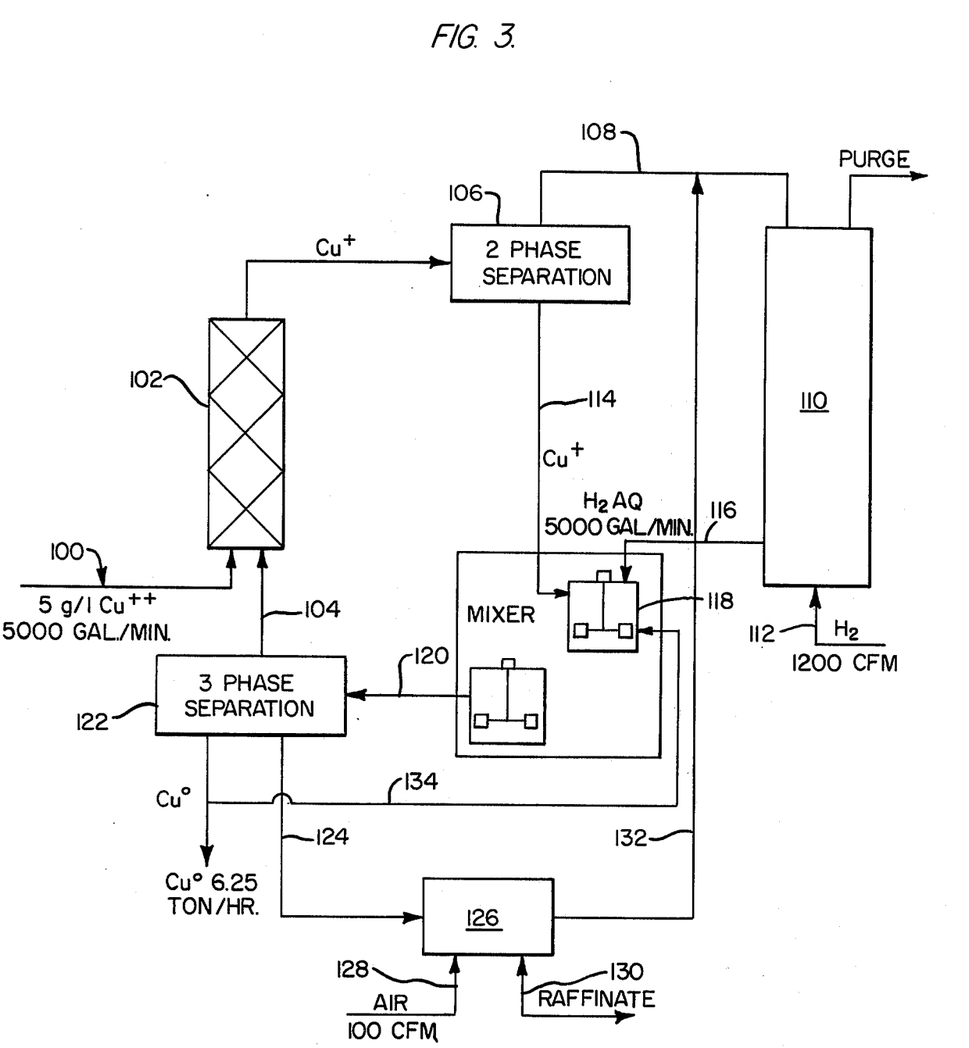
FIG. 3 is a diagram further illustrating various improvements of the process illustrated in FIG. 1.

FIG. 3 discloses a schematic diagram of a system which further illustrates the two-stage process of the invention. Ammoniacal cupric ion containing solution (5 g/l $Cu^{++}$) is introduced to first stage reactor (static mixer) 102 through conduit 100 at the rate of 5000 gal/min. The pregnant liquor, which may contain 0.05 moles/liter chloride or other ions and partially spent 2-ethylanthraquinol received from the second stage of the process through conduit 104, are intimately contacted in reactor 102 and the $Cu^{++}$ ions are rapidly reduced to $Cu^+$, which are stabilized by the presence of ammonia. The two phase mixture is then transferred to settler 106 where the organic phase containing 2-ethylanthraquinone and trace amounts of its counterpart quinol is separated from the aqueous phase containing the cuprous amine complex and chloride ion. The organic phase is transferred through conduit 108 to the hydrogenator 110 where the quinol is regenerated by hydrogen gas introduced via conduit 112 at the rate of 1200 CFM. As will be appreciated by those skilled in the art, a suitable hydrogenation catalyst must be used in hydrogenator 110 and a purge system will be necessary.

The aqueous phase containing cuprous ion is delivered through conduit 114 together with a 19 g/l 2-ethylanthraquinol solution, delivered at the rate of 5000 gal./min. through conduit 116, to second stage reactor (mixer) 118. In reactor 118, the cuprous ion is reduced to copper metal by the excess quinol present and the three phase slurry, depleted of soluble copper, is delivered through conduit 120 to three phase separator 122.

In separator 122, the partially quinol depleted organic phase is separated and delivered through conduit 104 to first stage reactor 102. Copper metal is recovered from separator 122 at the rate of 6.25 tons/hr. A portion of the copper powder may be recirculated to the second stage reactor (mixer) 118 through conduit 134 for seeding purposes. Seeding technique can be used where it is desirable to obtain the copper metal in larger particle sizes to produce a higher density copper powder. The aqueous phase containing trace quantities of anthraquinone, significant quantities of anthraquinol, and chloride ion is delivered through conduit 124 to a coalescer 126 where the anthraquinol is oxidized to essentially water insoluble anthraquinone.

The oxidation is accomplished by bubbling air through coalescer 126 from conduit 128 at the rate of 100 CFM. The copper raffinate is then removed from coalescer 126 via conduit 130, the recovered anthraquinone is delivered to hydrogenator 110 for regeneration via conduit 132. The circulating organic phase containing the quinol extractant consists of 30% diisobutylketone and 70% xylene.

The recycle of copper powder, after phase separation, back to the mixer has been found to result in larger particle size and higher density for the copper powder. This is a rather standard technique called "seeding". Details of a "seeding" experiment appear below.

| SEEDING EXPERIMENT | |
|---|---|
| Aqueous Solution | Organic Solution |
| 10 g/l Cu | 25 g/l 2-ethylanthraquinone |
| 1 N $NH_3$ | 50% 2-ethylhexanol |
| 0.25 N $NH_4^+$ | 50% xylenes |

The organic solution was hydrogenated in the presence of a catalyst.

Equal amounts of organic and aqueous solution were then mixed in a reactor. After the copper was reduced to copper metal the liquid phases were removed from the reactor. The copper powder remained in the reactor and another batch of aqueous and organic were added. Successive runs resulted in the growth of the copper particles.

COPPER PARTICLE SIZE GROWTH DURING BATCH RECYCLE EXPERIMENT

Per Cent of Particles Greater Than a Given Size

| Volumes | Cycles 6 | 13 | 27 | 66 | 88 |
|---|---|---|---|---|---|
| 4.2 | — | — | — | — | — |
| 8.4 | 100 | 100 | — | — | 100 |
| 16.7 | 99.4 | 99.6 | 100 | 100 | 99.8 |
| 33.5 | 97.8 | 99.2 | 99.4 | 99.4 | 99.4 |
| 67.0 | 95.6 | 97.8 | 98.4 | 98.4 | 98.6 |
| 134 | 93.2 | 94.6 | 96.0 | 95.6 | 97.4 |
| 258 | 87.2 | 90.8 | 91.4 | 91.4 | 94.3 |
| 536 | 73.0 | 85.6 | 86.0 | 86.0 | 87.2 |
| 1,072 | 42.0 | 61.4 | 72.8 | 65.6 | 75.2 |
| 2,145 | 13.2 | 21.6 | 25.8 | 33.4 | 37.0 |
| 4,316 | 2.6 | 4.2 | 4.8 | 6.2 | 8.6 |
| 8,580 | 0.2 | 0.6 | 1.0 | 0.6 | 1.4 |
| 17,157 | — | 0.2 | 0.2 | — | 0.1 |
| 34,270 | — | — | — | — | — |

While the above example utilizes 2-ethylanthraquinol as an organic extractant, it will be obvious that other quinolic extractants may be used. Non limiting examples of other useful quinolic compounds include 2(lower alkyl)-anthraquinols such as 2-methyl anthraquinol, 2-propyl anthraquinol, 2-tert-butyl anthraquinol, 2-isopropyl anthraquinol, 2-amyl anthraquinol, etc. While 2(lower alkyl)-anthraquinols are preferred, it is not necessary to use 2(lower alkyl) anthraquinols. Merely by way of example an anthraquinol of the general formula where, $R_1, R_2, R_3, R_4, = H$ or $C_1H_x$ to $C_8H_x$ can be used to advantage in the present invention.

A class of anthraquinols known as tetrahydroanthraquinols exists and can be expected to be present in any system where anthraquinols are hydrogenated.

Tetrahydroanthraquinols have the following structural formula

As can be seen from the above formula, tetrahydroanthraquinols differ from anthraquinols by having four additional hydrogens on one of the aromatic rings. Tetrahydroanthraquinols are slowly built up in the organic solution by a slow side reaction during the hydrogenation of anthraquinols. Therefore, they will be present in any commercial process. It is possible to suppress the formation reaction and to treat a bleed stream to regenerate the anthraquinol from the tetrahydroanthraquinol. However, they have the capability of reducing $Cu^{++}$ to $Cu^0$. These tetrahydro derivatives are known to be more difficult to hydrogenate than anthraquinones. In general, the more difficult a member of the quinone family is to hydrogenate the greater the reducing powder. Hence tetrahydroderivatives react more rapidly with $Cu^{++}$ than the anthraquinols. Thus, such derivatives are useable in the present process.

In short the present invention can be utilized with any quinolic compound which is capable of reducing soluble copper and which is capable of being regenerated back to the quinolic form.

In addition to hydrogen, $H_2S$ with an amine catalyst can be used to reduce the quinonic compound back to the quinolic compound in the hydrogenation step. Details of this process are set forth in U.S. Pat. No. 3,923,966 to Vaughan, the teachings of which are incorporated herein by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for producing metallic copper from an aqueous copper solution, said process being characterized by the steps of contacting said aqueous solution with a quinolic compound to precipitate metallic copper, said quinolic compound being dissolved in a substantially water immiscible solvent capable of also dissolving the quinonic compound which forms during the reactions, and separating metallic copper from the reaction system, wherein the improvement comprises adding an amount of an ion selected from the group consisting of chloride ions, bromide ions, thiocyanate ions, and mixtures thereof, to said aqueous copper solution in amounts which are effective to increase the rate of copper precipitation.

2. The process as set forth in claim 1 wherein chloride ions are added in a concentration between the range of 0.1M and 0.0001M.

3. The process as set forth in claim 2 wherein the ratio of chloride concentration to copper concentration is between about 1 and 0.01.

4. The process as set forth in claim 1 wherein said copper containing solution comprises an ammoniacal cuprous solution.

5. The process as set forth in claim 1 wherein said copper containing solution has a pH greater than 7 and the concentration of ions used is less than 1M.

6. The improved process as set forth in claim 5 wherein the pH of said solution is about 10.

7. The process as set forth in claim 6 wherein said copper containing solution comprises an ammoniacal cupric solution.

8. The improved process as set forth in claim 1 wherein said copper containing solution has a pH less than 7 and the concentration of ion used is less than about 0.1M.

9. The process as set forth in claim 1 wherein said substantially water immiscible solvent comprises a mixture of an organic nonpolar solvent and an organic polar solvent.

10. The process as set forth in claim 9 wherein said mixture comprises more than 50% by weight of said nonpolar solvent.

11. The process as set forth in claim 10 wherein said nonpolar solvent is selected from the group consisting of xylene, toluene, or lower alkyl-substituted benzenes, and naphthalenes, and said polar solvent is selected from the group consisting of alcohols, ketones, and esters.

12. The process as set forth in claim 1 wherein said quinolic compound is selected from the group consisting of 2 methyl anthraquinol, 2 ethyl anthraquinol, 2 propyl anthraquinol, 2 tert butyl anthraquinol, 2 isopropyl anthraquinol, and 2 amyl anthraquinol.

13. A process for producing copper metal from an aqueous ammoniacal cupric ion containing solution, said process being characterized by the steps of:
   1. mixing a stoichiometric excess of a quinolic compound and an aqueous ammoniacal solution of cuprous ions in a first reactor to precipitate copper metal and to oxidize part of said quinolic compound to a quinonic compound, said ammoniacal solution also containing ions selected from the group consisting of chloride ions, bromide ions, thiocyanate ions and mixtures thereof in amounts effective to increase the rate of copper precipitation; the remaining quinolic compound and the produced quinoic compound being dissolved in a substantially water immiscible solvent;
   2. separating said water immiscible solvent from the coper metal and the aqueous solution;
   3. mixing the immiscible solvent containing the remaining quinolic compound which is separated in step (2) with an ammoniacal solution of cupric ions in a second reactor to enable said quinolic compound to reduce said cupric ions to cuprous ions and to produce further quinonic compound;
   4. separating the immiscible solvent from the solution of cuprous ions produced in step (3); and
   5. adding the solution of cuprous ions separated in step (4) to said first reactor and repeating step (1).

14. The process as set forth in claim 13 including the additional steps of:
   6. reducing the quinonic compound produced in step (1) and step (3(, which is dissolved in said immiscible solvent separated in step (4), to produce a quinolic compound; and
   7. adding the quinolic compound produced in step (6) to said first reactor to be utilized in step (1).

15. The process as set forth in claim 14 wherein said quinolic compound is a 2-(lower alkyl)-anthraquinol selected from the group consisting of 2-methyl anthraquinol, 2-ethyl anthraquinol, 2-propyl-anthraquoinol, 2-tert-butyl-anthraquinol, 2-isopropyl anthraquinol, and 2-amyl anthraquinol.

16. The process as set forth in claim 14 wherein said substantially water immiscible solvent is a mixed organic solvent comprising an organic nonpolar solvent and an organic polar solvent and wherein said nonpolar solvent comprises more than 50% by weight of said mixed solvent.

17. The process as set forth in claim 16 wherein said nonpolar solvent comprising between 60–80% by weight of said mixed solvent.

18. The process as set forth in claim 17 wherein said nonpolar solvent comprises a solvent selected from the group consisting of xylene, toluene, lower alkyl-substituted benzenes, and naphthalenes, and said polar solvent is selected from the group consisting of alcohols, ketones, and esters.

19. The process as set forth in claim 14 wherein in step (6) the quinonic compound is reduced by reacting the quinonic compound with hydrogen in the presence of a hydrogenation catalyst.

20. The process as set forth in claim 14 wherein in step (6) the quinonic compound is reduced by reacting said quinonic compound with $H_2S$ in the presence of an amine catalyst.

21. In a process of the type in which copper metal is precipitated from an aqueous ammoniacal solution containing copper ions by contacting the copper ions with a quinolic compound to reduce the copper ions and to produce metallic copper wherein the improvement comprises:
   a. providing the aqueous solution with ions selected from the group consisting of chloride ions, bromide ions, thiocyanate ions and mixtures thereof in amounts effective to increase the rate of copper precipitation;
   b. contacting the aqueous solution with a quinolic compound in an amount only sufficient to convert cupric copper to cuprous copper;
   c. thereafter contacting the cuprous ions produced in step (b) with at least twice the stiochiometric amount of the quinolic compound necessary to convert the cuprous ions to copper metal to convert the cuprous ions to metallic copper; and
   d. thereafter flowing the unreacted quinolic compound to step (b) to reduce cupric ions to cuprous ions.

22. The process as set forth in claim 21 wherein in steps (b) and (c) the quinolic compound is oxidized to a quinonic compound and the quinonic compound is recovered and reduced for reuse.

23. The process as set forth in claim 22 wherein in the quinonic compound is reduced by reacting the quinonic compound with hydrogen in the presence of a hydrogenation catalyst.

24. The process as set forth in claim 22 wherein the quinonic compound is reduced by reacting said quinonic compound with $H_2S$ in the presence of an amine catalyst.

25. The process as set forth in claim 22 wherein said quinolic compound is a 2-(lower alkyl)-anthraquinol selected from the group consisting of 2-methyl anthraquinol, 2-ethyl anthraquinol, 2-propyl-anthraquinol, 2-tert-butyl-anthraquinol, 2-isopropyl anthraquinol, and 2-amyl anthraquinol.

26. The process as set forth in claim 22 wherein the pH of said ammoniacal solution is between the range of 9.5 to 11.

* * * * *